US007110247B2

(12) United States Patent
Kim et al.

(10) Patent No.: US 7,110,247 B2
(45) Date of Patent: Sep. 19, 2006

(54) TOUCH PANEL HOLDER FRAME, SPACER MEMBER, AND DISPLAY DEVICE

(75) Inventors: Kyungwoo Kim, Yokkaichi (JP); Yoshihiko Gotoh, Yokkaichi (JP)

(73) Assignee: Sumitomo Wiring Systems, Ltd., Mie (JP)

( * ) Notice: Subject to any disclaimer, the term of this patent is extended or adjusted under 35 U.S.C. 154(b) by 0 days.

(21) Appl. No.: 10/686,733

(22) Filed: Oct. 17, 2003

(65) Prior Publication Data

US 2004/0169689 A1  Sep. 2, 2004

(30) Foreign Application Priority Data

Feb. 28, 2003  (JP)  ............................. 2003-052449

(51) Int. Cl.
*G06F 1/16*   (2006.01)
*H05K 5/00*   (2006.01)
*H05K 7/00*   (2006.01)

(52) U.S. Cl. ...................... 361/681; 248/201; 248/917; 248/918

(58) Field of Classification Search ................ 248/201, 248/300, 309.1, 918, 917; 361/681, 142
See application file for complete search history.

(56) References Cited

U.S. PATENT DOCUMENTS

| 5,410,373 | A | * | 4/1995 | Sagues et al. ............... 348/825 |
| 5,588,621 | A | * | 12/1996 | Collins et al. ............. 248/27.1 |
| 5,729,289 | A | * | 3/1998 | Etoh ..................... 348/333.02 |
| 2001/0043291 | A1 | * | 11/2001 | Kono et al. .................. 349/12 |
| 2005/0030728 | A1 | * | 2/2005 | Kawashima et al. .......... 362/31 |

FOREIGN PATENT DOCUMENTS

JP   A 2000-222126   8/2000

* cited by examiner

*Primary Examiner*—Amy J. Sterling
(74) *Attorney, Agent, or Firm*—Oliff & Berridge, PLC

(57) ABSTRACT

A first positioning enclosure of a touch panel holder frame is attached to a display device body to surround an outer periphery of a display screen. A second positioning enclosure is attached to the display device body to surround an outer periphery of a touch panel. Holding pawl sections provided on an inner surface of the second positioning enclosure engage the outer periphery of the touch panel to prevent the touch panel from coming out of the touch panel holder frame. A spacer section extends between the first and second positioning enclosures to define a given clearance between the display screen and the touch panel.

11 Claims, 3 Drawing Sheets

TOUCH PANEL HOLDER FRAME, SPACER MEMBER, AND DISPLAY DEVICE

CLAIM FOR PRIORITY

The present invention claims priority to Japanese Patent Application JP-A-2003-052449 filed Feb. 28, 2003.

BACKGROUND OF THE INVENTION

1. Field of Invention

This invention relates to a technical idea for attaching and fixing a touch panel to a display device.

2. Description of Related Art

Heretofore, there is a technical idea for sticking a touch panel on a display device body by using a pressure sensitive double-coated tape, as disclosed in, for example, Japanese Patent Public Disclosure 2000-222126. However, the above prior art has required a work for sticking the pressure sensitive double-coated tape on a periphery of the display device body or the touch panel. This will bring a complex assembly work.

When the pressure sensitive double-coated tape has been detached from the display device body or the touch panel, the touch panel is displaced from a regular position, or an unusual sound or an erroneous operation occurs. Therefore, there exists a need for readily positioning the touch panel with respect to the display device body.

SUMMARY OF THE INVENTION

In order to achieve the object, a first aspect in the embodiments of the present invention is directed to a touch panel holder frame including a first positioning enclosure attached to a display device body to surround a whole or a part of an outer periphery of a display screen; a second positioning enclosure attached to a touch panel to surround a whole or a part of an outer periphery of the touch panel; and holding pawl sections provided on an inner surface of the second positioning enclosure for engaging the outer periphery of the touch panel to prevent the touch panel from coming out of the touch panel holder frame.

In a second aspect in the embodiments of the present invention, a spacer section may be provided to extend between the first and second positioning enclosures.

In a third aspect in the embodiments of the present invention, the first and second positioning enclosures and the spacer section may be integrated together with one another and made of a non-cellular resin material.

In a fourth aspect in the embodiments of the present invention, a spacer member includes an integrated frame-like body adapted to be disposed around a display screen of a display device body.

In fifth aspect in the embodiments of the present invention, the integrated frame-like body of the spacer member may be made of a non-cellular resin material.

A sixth aspect in the embodiments of the present invention is directed to a display device including a display device body having a display screen; a touch panel having a touch detection area corresponding to the display screen; a first positioning enclosure attached to a display device body to surround a whole or a part of an outer periphery of a display screen; a second positioning enclosure attached to a touch panel to surround a whole or a part of an outer periphery of the touch panel; and holding pawl sections provided on an inner surface of the second positioning enclosure for engaging the outer periphery of the touch panel to prevent the touch panel from coming out of the touch panel holder frame.

In a seventh aspect in the embodiments of the present invention, a spacer section extends between the first and second positioning enclosures to define a given clearance between the display screen and the touch panel.

BRIEF DESCRIPTION OF THE DRAWINGS

The features of the embodiments of the present invention believed to be novel and the elements characteristic in these embodiments are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DETAILED DESCRIPTION OF EXEMPLARY EMBODIMENTS

Figure 1:
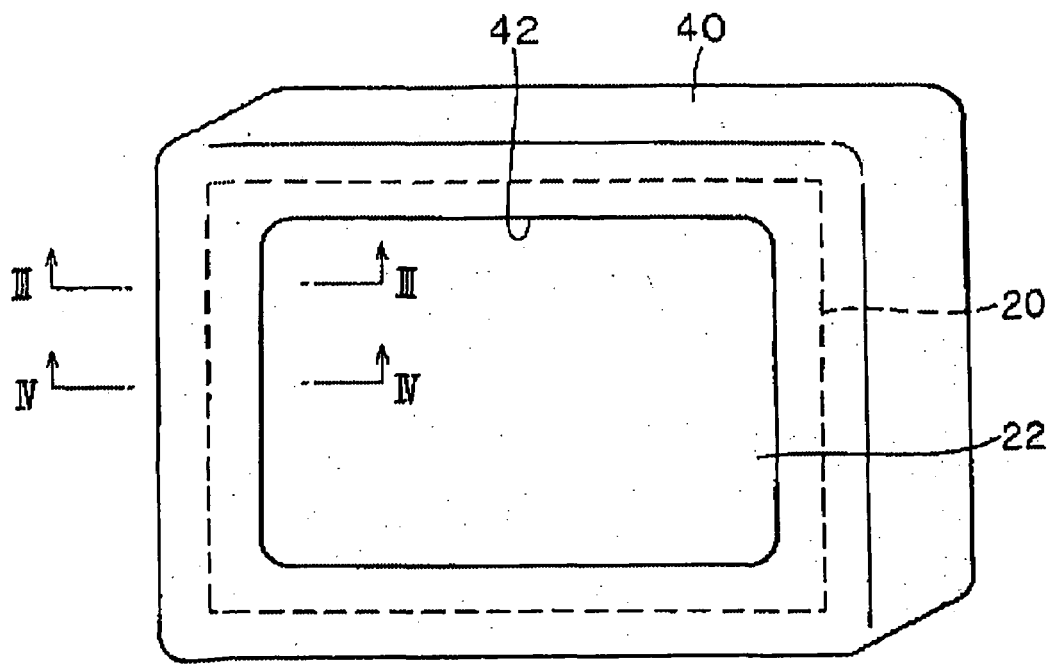
FIG. 1 is a general perspective view of an embodiment of a display device in accordance with the present invention.

In describing the preferred embodiment of the present invention, reference will be made herein to FIGS. 1 to 5 and 7 of the drawings in which like numerals refer to like features of the invention. Features of the invention are not necessarily shown to scale in the drawings.

Referring now to the drawings, an embodiment of a display device in accordance with the present invention will be described below.

Figure 2:
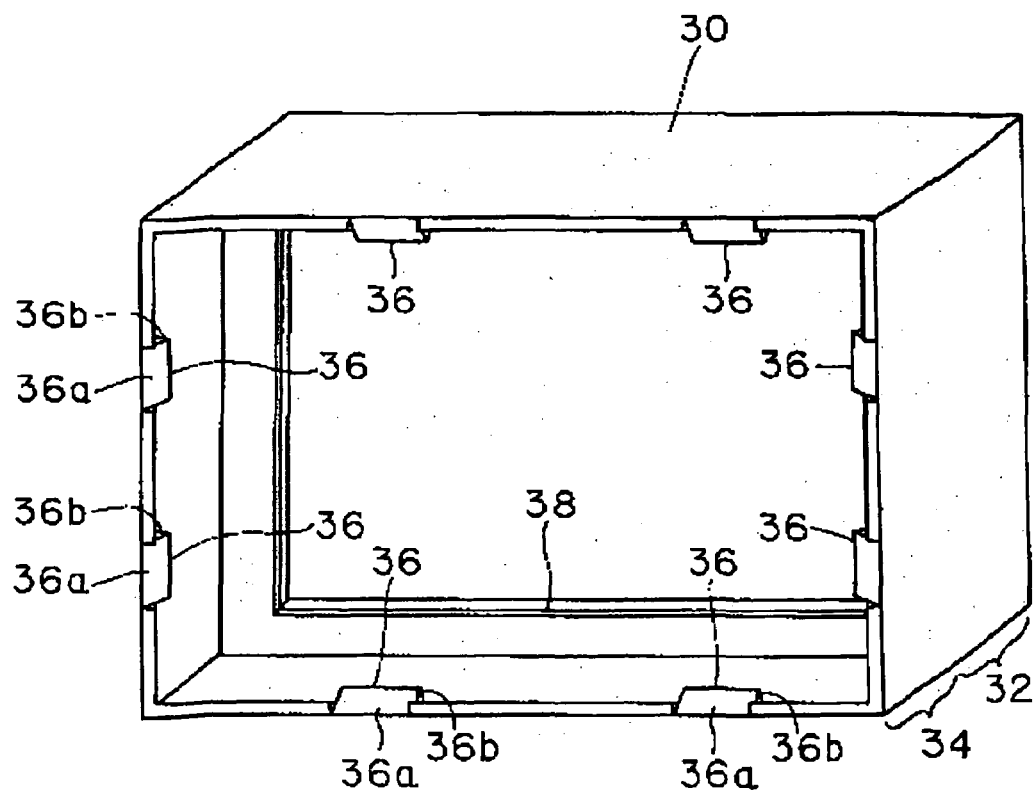
FIG. 2 is a general perspective view of an embodiment of a touch panel holder frame in accordance with the present invention.
Figure 3:
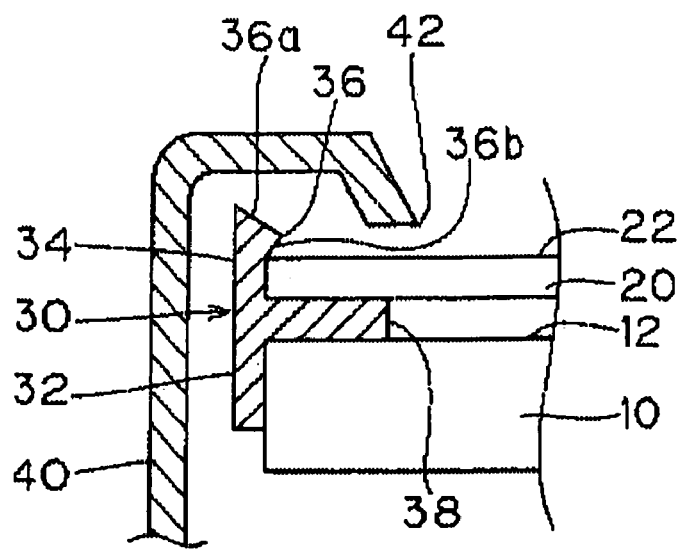
FIG. 3 is a cross section view of the display device taken along line III—III in FIG. 1.
Figure 4:
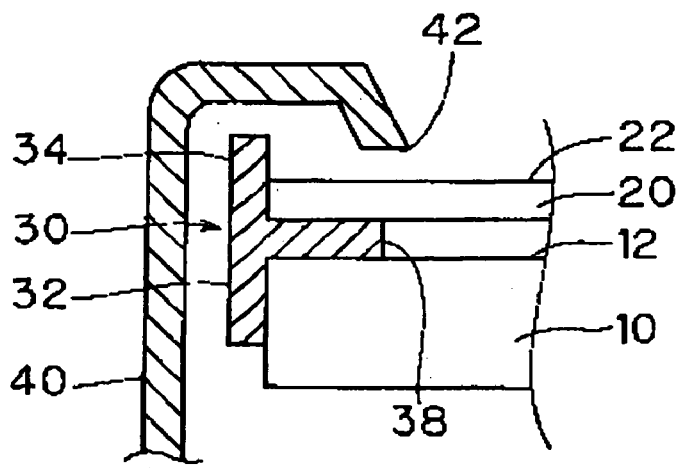
FIG. 4 is a cross section view of the display device taken along line IV—IV in FIG. 1.

FIG. 1 is a general perspective view of an embodiment of a display device in accordance with the present invention. FIG. 2 is a general perspective view of an embodiment of a touch panel holder frame in accordance with the present invention. FIG. 3 is a cross section view of the display device taken along line III—III in FIG. 1. FIG. 4 is a cross section view of the display device taken along line IV—IV in FIG. 1.

The display device includes a display device body 10, a touch panel 20, and a touch panel holder frame 30. These display device body 10, touch panel 20, and touch panel holder frame 30 are integrated and incorporated in a panel casing 40. The display device is mounted on, for example, an automobile vehicle. The display device is disposed in, for example, a dashboard at a front section opposite from a section between a driver's seat and a passenger's seat. The display device will show up a given navigation screen.

The display device body 10 includes, for example, a liquid crystal display device and is formed into a flat box-like configuration. The display device body 10 is provided on a front side with a display screen 12 for showing up a given image.

The touch panel 20 is formed into a substantially square plate-like configuration. In this embodiment, the touch panel 20 is formed into a substantially square plate-like configuration having the same shape and size as those of an outer peripheral plane including the display screen 12 of the display device body 10. The touch panel 20 has a touch detection area 22 with a shape and a size corresponding to the display screen 12. When a user touches a given position in the touch detection area 22 by his or her finger, the touched position is detected. The detected signal is applied to a control device such as a navigation control device or the like. The control device performs a given process in accordance with the detected signal.

There are in such kind of the touch panel 20 infrared ray systems in which infrared rays are irradiated on the touch panel 20 in lattice (crisscross) and that detect a position where the infrared rays are shut off, and conductive wire systems in which a plurality of conductive wires are arranged on the touch panel in lattice (crisscross) and that detect a position where the conductive wires contact with each other.

The touch panel holder frame 30 is a molded product made of a resin material, in particular, a non-cellular resin material. The touch panel holder frame 30 includes a first positioning enclosure 32 to be attached to the display device body 10, a second positioning enclosure 34 to be attached to the touch panel 20, holding pawl sections 36 provided on the second positioning enclosure 34, and a spacer section 38 extending between the first and second positioning enclosures 32 and 34.

The first positioning enclosure 32 is attached to the display device body 10 so that the enclosure 32 surrounds a whole or a part of an outer periphery of the display screen 12. In this embodiment, the first positioning enclosure 32 is formed into a substantially square frame-like configuration having an inner peripheral shape corresponding to an outer peripheral shape of the display screen 12 of the display device body 10. The first positioning enclosure 32 is attached to the display device body 10 to surround a whole of an outer periphery of the display screen 12.

The first positioning enclosure 32 may surround a part of the outer periphery of the display device body 10. For example, the first positioning enclosure 32 may contact with intermediate portions of right and left side surfaces and intermediate portions of upper and lower side surfaces of the outer periphery of the display device body 10. In summary, the first positioning enclosure 32 may be attached to the outer periphery of the display device body 10 so that a relative position between the first positioning enclosure 32 and the display device body 10 can be held in a direction along a plane (in a plane direction) of the display screen 12.

Although a friction force exerted between an inner peripheral surface of the first positioning enclosure 32 and an outer peripheral surface of the display device body 10 holds an engagement between the first positioning enclosure 32 and the display device body 10 in the above embodiment, the following structure may be adopted. The structure may be utilized in which the first positioning enclosure 32 is fixed on the display device body 10 in an anti-detachment manner by using screws or the same engaging means as the holding pawl sections 36 of the second positioning enclosure 34. Also, a periphery of an opening 42 in a panel casing 40 may engage the touch panel frame 30 to push the frame 30 toward the display device body 10.

The second positioning enclosure 34 is attached to the touch panel 20 to surround a whole or a part of an outer periphery of the touch panel 20. In this embodiment, the second positioning enclosure 34 is formed into a substantially square frame-like configuration having an inner peripheral shape corresponding to an outer peripheral shape of the touch panel 20. The second positioning enclosure 34 is attached to the touch panel 20 to surround the whole outer periphery of the touch panel 20.

The second positioning enclosure 34 may surround a part of the outer periphery of the touch panel 20 by the same manner as the structure described in association with the first positioning enclosure 32. The second positioning enclosure 34 may be attached to the touch panel 20 to hold a relative position between the second positioning enclosure 34 and the touch panel 20 in a plane direction (in a direction along a plane) of the touch detection area 22.

The holding pawl sections 36 are provided on the second positioning enclosure 34 to prevent the touch panel from coming out from the touch panel holder frame 30. In this embodiment, a plurality of holding pawl sections 36 are provided on an end of an inner peripheral surface of the second positioning enclosure 34 and spaced away from each other at a given distance in the circumferential direction. The holding pawl sections 36 may be continued along the end of the inner peripheral surface of the second positioning enclosure 34.

Each holding pawl section 36 includes a slant surface 36a inclined toward the first positioning enclosure 32 (display device body 10) and a stop surface 36b opposed to the display device body 10 (spacer section 38 described after).

When the touch panel 20 is pushed into the second positioning enclosure 34, the respective holding pawl sections 36 engage the outer peripheral surface of the touch panel 20 to prevent the touch panel 20 from coming out from the second positioning enclosure 34.

The spacer section 38 extends from an inner peripheral surface between the first and second positioning enclosures 32 and 34 inwardly. The spacer section 38 has a length that does not extend over the display screen 12 and the touch detection area 22. The spacer section 38 has a thickness that defines a suitable clearance f between the display screen 12 and the touch panel 20 (see FIG. 5). The suitable clearance f between the display screen 12 and the touch panel 20 means a distance that the touch panel 20 does not contact with the display screen 12 in consideration of deflection of the touch panel 20 upon touch operation.

Even if the spacer section 38 is separated from the first and second positioning enclosures 32 and 34, the spacer section 38 can serve as a spacer for defining a given clearance between the display device body 10 and the touch panel 20.

Furthermore, a clearance is provided between the spacer section 38 and the stop surface 36b to define the substantially same clearance as the thickness of the touch panel 20. When the touch panel 20 is pushed into the second positioning enclosure 34, the outer periphery of the touch panel 20 is clamped between the spacer section 38 and the respective holding pawl sections 36.

In this embodiment, the spacer section 38 extends from a whole of the inner peripheral surface between the first and second positioning enclosures 32 and 34. However, plural spacer sections 38 may be provided to extend from a part of the inner peripheral surface of the enclosures 32 and 34 so that the spacer sections 38 are spaced away from one another at a suitable distance in the peripheral direction.

The panel casing 40 is made of a resin material or the like and is formed into a box-like configuration that can contain the integrated display device body 10, touch panel 20, and touch panel holder frame 30. The panel casing 40 is provided in a front side with an opening 42 corresponding to the display screen 12 and touch detection area 22. The display screen 12 and touch detection area 22 are visible and touchable through the opening 42 from the outside.

A method for assembling the display device will be described below.

Firstly, the outer periphery of the display screen 12 of the display device body 10 is pushed into the first positioning enclosure 32 and the first positioning enclosure 32 is attached to the outer periphery of the display device body 10.

After or before carrying out the above step, the touch panel 20 is pushed into the second positioning enclosure 34. Then, the outer periphery of the touch panel 20 contacts with the slant surface 36a of each holding pawl section 36 and the end of the first positioning enclosure 32 is deflected outwardly. After the outer periphery of the touch panel 20 slides over the respective holding pawl sections 36, the end of the first positioning enclosure 32 returns to the original position by its elasticity. Thus, the outer periphery of the touch panel 20 is clamped between the spacer section 38 and the respective holding pawl sections 36 and the second positioning enclosure 34 is attached to the touch panel 20.

According to the display device constructed above, when the outer periphery of the touch panel 20 is fifed into the second positioning enclosure 34, the touch panel 20 can be easily positioned and fixed in the plane direction (horizontal direction) and a coming-off direction (vertical direction).

In particular, the first and second positioning enclosures 32 and 34 and the spacer section 38 are integrated together with one another. Thus, an assembly work of them becomes easy.

Because the outer periphery of the display screen 12 of the display device body 10 is attached to the first positioning enclosure 32, a relative position between the touch panel 20 and the display device body 10 in the plane direction of the display screen 12 (in the direction along the plane of the touch detection area 22) can be defined. The respective holding pawl sections 36 can prevent the touch panel 20 from coming out from the touch panel holder frame 30. Thus, it is possible to firmly secure the touch panel 20 to the display device body 10 in position.

In particular, a relative position between the display screen 12 and the touch panel 20 in the plane direction of the display screen 12 (in the direction along the plane of the touch detection area 22) can be maintained to be constant. Hence, it is possible to eliminate a displacement between a display information on the display screen 12 and a touch position onto the touch detection area 22, thereby preventing an erroneous operation.

Because the spacer section 38 extends between the first and second positioning enclosures 32 and 34, it is possible to maintain a clearance between the display screen 12 of the display device body 10 and the touch panel 20 constant. Consequently, when a user touches the touch panel 20, the touch panel 20 does not contact with the display screen 12.

Figure 5:
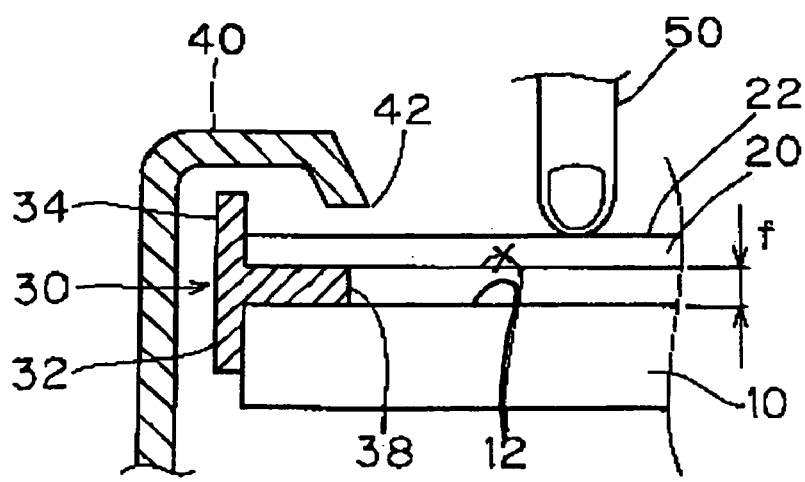
FIG. 5 is a cross section view similar to FIG. 4, illustrating a touch operation onto a touch panel.

Because the touch panel holder frame 30, in particular, the spacer section 38 is a molded product made of a non-cellular resin material, as shown in, for example, FIG. 5, even if the touch panel 20 is pushed by a finger 50, the spacer section 38 is hardly deflected by the pushing force. Consequently, it is possible to maintain the clearance f (see FIG. 5) between the display screen 12 of the display device body 10 and the touch panel 20 constant.

Figure 6:
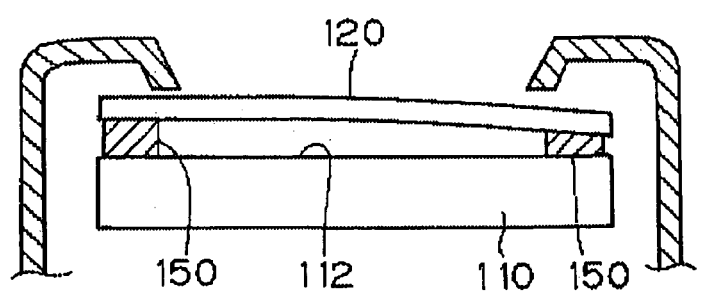
FIG. 6 is a cross section view of a conventional display device, illustrating a disadvantage in the display device.

In the prior art, as shown in FIG. 6, since a touch panel 120 was attached to a display device body 110 by a pressure sensitive double coated tape 150, there was a problem that a base material or the like of the tape 120 is partially pressed and deformed. This will cause the touch panel 120 to be inclined relative to a display screen 112. In this case, some touch panels 120 will cause interference fringes.

Figure 7:
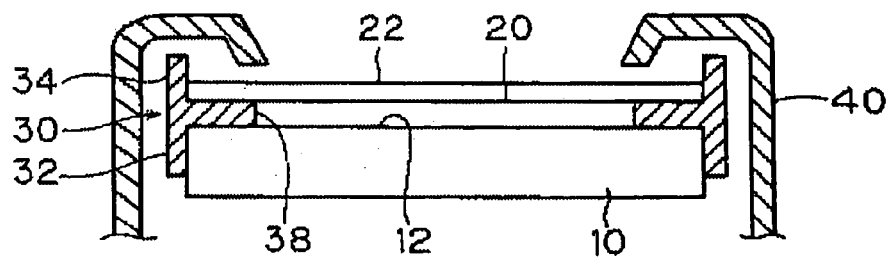
FIG. 7 is a cross section view of a display device of the present invention, illustrating an advantage in the display device.

On the contrary, in the present embodiment, since the touch panel holder frame 30, in particular, the spacer section 38 is a molded product made of a non-cellular resin material, as shown in FIG. 7, it is possible to maintain the clearance between the display screen 12 and the touch panel 20 in the whole outer periphery of the display screen 12 more constant and keep the touch panel 20 in parallel with respect to the display screen 12. This can suppress the interference fringes.

The entire disclosure of Japanese Patent Application No. 2003-052449 filed on Feb. 28, 2003 including the specification, claims, drawings and summary is incorporated herein by reference in its entirety.

While the present invention has been particularly described, in conjunction with a specific preferred embodiment, it is evident that many alternatives, modifications, and variations will be apparent to those skilled in the art in light of the foregoing description. It is therefore contemplated that the appended claims will embrace any such alternatives, modifications, and variations as falling within the true scope and spirit of the present invention.

What is claimed is:

1. A touch panel holder frame for an electronic device that includes a touch panel and a display device body having a display screen, said touch panel holder frame comprising:
   a first positioning enclosure that engages the display device body along a portion of a plate thickness of the display device body to surround a whole or a part of an outer periphery of the display screen;
   a second positioning enclosure that engages the touch panel along a portion of a plate thickness of the touch panel to surround a whole or a part of an outer periphery of the touch panel, said second positioning enclosure having an inner surface;
   a spacer section that connects said first positioning enclosure and said second positioning enclosure and separates the display screen from the touch panel by a clearance distance; and
   a plurality of holding pawl sections, provided on the inner surface of said second positioning enclosure at positions remote from said spacer section, that engage the outer periphery of the touch panel and retain the touch panel within the second positioning enclosure of said touch panel holder frame.

2. The touch panel holder frame according to claim 1, wherein said spacer section extends between and connects said first positioning enclosure and said second positioning enclosure.

3. The touch panel holder frame according to claim 2, wherein said first positioning enclosure, said second positioning enclosure and said spacer section are integrated in a single piece made of a non-cellular resin material.

4. The touch panel holder frame according to claim 1, wherein the spacer section includes an integrated frame that is disposed around the peripheral edge of the display screen of the display device body.

5. The touch panel holder frame according to claim 4, wherein said integrated frame is made of a non-cellular resin material.

6. A display device comprising:
a display device body having an electronic display screen;
a touch panel having a touch detection area corresponding to said display screen;
a touch panel holder frame, comprising:
  a first positioning enclosure that engages said display device body along a portion of a plate thickness of said display device body to surround a whole or a part of an outer periphery of the display screen;
  a second positioning enclosure that engages said touch panel along a portion of a plate thickness of said touch panel to surround a whole or a part of an outer periphery of said touch panel, said second positioning enclosure having an inner surface;
  a spacer section that connects said first positioning enclosure and said second positioning enclosure and separates the electronic display screen of said display device body from said touch panel by a clearance distance; and
  a plurality of holding pawl sections, provided on the inner surface of said second positioning enclosure at positions remote from said spacer section, that engage said touch panel at the outer periphery of said touch panel and retain said touch panel within said second positioning enclosure of said touch panel holder frame; and
a panel casing having an opening, said panel casing containing said display device body, said touch panel and said touch panel holding frame, such that the electronic display screen of said display device body and the touch detection area of said touch panel face the opening of said panel casing.

7. The touch panel holder frame according to claim 1, wherein said first positioning enclosure, said second positioning enclosure and said spacer section have a T-shape cross-section at a peripheral portion thereof, such that a cross-bar of the T-shape cross-section forms said first positioning enclosure and said second positioning enclosure.

8. The touch panel holder frame according to claim 1, wherein said first positioning enclosure has a first peripheral thickness, and said second positioning enclosure has a second peripheral thickness substantially equal to the first peripheral thickness.

9. The touch panel holder frame according to claim 3, wherein said first positioning enclosure, said second positioning enclosure and said spacer section have a T-shape cross-section at a peripheral portion thereof, such that a cross-bar of the T-shape cross-section forms said first positioning enclosure and said second positioning enclosure.

10. The touch panel holder frame according to claim 1, wherein said spacer section engages one surface of the touch panel at a peripheral portion thereof, and said plurality of holding pawl sections engage an other surface of the touch panel opposite the one surface and retain the touch panel between said plurality of pawl sections and said spacer section.

11. The touch panel holder frame according to claim 10, wherein said plurality of pawl sections provide a bias force on the other surface of the touch panel and capture the touch panel between said plurality of pawl sections and said spacer section.

* * * * *